United States Patent [19]

Parker

[11] 4,377,459

[45] Mar. 22, 1983

[54] PROCESS FOR CHLORINATION OF POLY(VINYL CHLORIDE) WITH LIQUID CHLORINE, AND CHLORINATED POLY(VINYL CHLORIDE) COMPOSITION

[75] Inventor: Richard G. Parker, Hudson, Ohio

[73] Assignee: The B. F. Goodrich Company, Akron, Ohio

[21] Appl. No.: 177,969

[22] Filed: Aug. 14, 1980

[51] Int. Cl.³ .......................... C08F 2/46; C08F 8/22; C08F 12/18; C08J 3/28
[52] U.S. Cl. .............................. 204/159.18; 525/192; 525/239; 525/356; 525/358; 525/331.5
[58] Field of Search ...................... 204/159.18, 159.17; 525/330, 356, 358, 239, 192

[56] References Cited

U.S. PATENT DOCUMENTS

| | | | |
|---|---|---|---|
| 2,590,651 | 3/1952 | Rosenberg | 204/159.18 |
| 2,996,489 | 8/1961 | Dannis et al. | 204/159.18 |
| 3,100,762 | 8/1963 | Shockney | 525/358 |
| 3,459,692 | 8/1969 | Buning et al. | 525/239 |
| 3,551,400 | 12/1970 | Yonezu et al. | 525/330 |
| 3,585,117 | 6/1971 | Gresser et al. | 525/159.18 |
| 3,736,240 | 5/1973 | Weintraub | 525/356 |
| 3,935,181 | 1/1976 | Schoen | 204/159.18 |
| 4,039,732 | 8/1977 | Schoen et al. | 525/356 |

FOREIGN PATENT DOCUMENTS

| | | |
|---|---|---|
| 471037 | 9/1951 | Canada . |
| 548486 | 4/1941 | United Kingdom ................ 525/358 |
| 861505 | 2/1961 | United Kingdom ........... 204/159.18 |
| 1089323 | 11/1967 | United Kingdom . |
| 1242158 | 11/1971 | United Kingdom . |
| 1318078 | 5/1973 | United Kingdom . |

*Primary Examiner*—Melyn I. Marquis
*Assistant Examiner*—Herbert J. Lilling
*Attorney, Agent, or Firm*—James R. Lindsay

[57] ABSTRACT

A process is disclosed for the preparation of chlorinated poly(vinyl chloride), (hereinafter "CPVC" for brevity), in the form of free-flowing macrogranules which are derived from solid free-flowing macrogranules of poly(vinyl chloride), (hereinafter "PVC" for brevity), by causing from about 0.6 to about 3.0 parts by weight (wt) of liquid chlorine which are absorbed perunit wt of solid PVC macrogranules to react with the PVC, without shedding reacted material from the macrogranules. The macrogranules of PVC containing absorbed liquid chlorine held therewithin, are maintained in a wetted but free-flowing, apparently dry reaction mass (due to which the process is referred to as "the relatively dry chlorination" or "the low liquid chlorine" process), in a reaction zone maintained at a temperature in the range from about −50° C. to about 50° C., and a pressure sufficient to maintain the chlorine in its liquid state. The reaction is carried out in the presence of actinic radiation, but without swelling agents and the like. The process may be operated as a batch process, or a continuous process.

The CPVC formed by the process of this invention has improved processing and working characteristics. This CPVC is distinguishable from prior art CPVC compositions by its spectral fingerprint, and by the presence of 5-15 percent by weight (% by wt) of the CPVC as glassy macrogranules.

In another embodiment of the invention, a process is disclosed for simultaneously chlorinating (hence "co-chlorinating") a free-flowing mixture of solid PVC macrogranules and solid polyethylene ("PE") particles, without shedding reacted material from the macrogranules, to yield a mixed reaction product of separate macrogranules of CPVC and particles of chlorinated polyolefin, which mixture, in a preselected ratio of its components, may be directly used in an injection molding machine.

The reaction product formed by the co-chlorination process is visually distinguishable by the characteristic coating of individual CPVC macrogranules with particles of chlorinated polyethylene ("CPE" for brevity).

20 Claims, 6 Drawing Figures

PROCESS FOR CHLORINATION OF POLY(VINYL CHLORIDE) WITH LIQUID CHLORINE, AND CHLORINATED POLY(VINYL CHLORIDE) COMPOSITION

BACKGROUND OF THE INVENTION

The wide use of poly(vinyl chloride) resins (hereinafter "PVC" for brevity), because of their economic availability, is limited to those applications where thermal stability is of secondary importance. In other applications where a thermally stable resin is essential, chlorinated poly(vinyl chloride) resins (hereinafter "CPVC" for brevity), are employed. The chlorination of PVC has been studied in great detail over the past twenty years or so, and numerous chlorination processes have been developed. Most preferred is a process carried out by suspending PVC in water, which PVC is swollen with a lower halogenated hydrocarbon swelling agent, and irradiating swollen PVC with ultraviolet light while bubbling chlorine gas into the water. This process is disclosed in U.S. Pat. No. 2,996,489 to Dannis, M. L. and Ramp, F. L. Several subsequent inventions related to this basic process have been disclosed in the textbooks "Polyvinylchloride und Vinylchloride—Mischpolymerizate," pp 120-125, Springer, Berlin (1951); "Vinyl and Related Polymers," by C. A. Schildknecht (1952); and in U.S. Pat. Nos. 2,426,808; 2,590,651; 3,100,762; 3,334,077; 3,334,078; inter alia. The disadvantage of these liquid-phase processes in which the reaction occurs in a liquid medium, is that (a) chlorine dissolves in water with difficulty, and even at elevated temperature and pressure, chlorinated product forms relatively slowly; and, (b) it is only with difficulty and expense that essentially all the swelling agent used in these processes can be removed from the CPVC product.

Other processes use reaction in a liquid medium without a swelling agent, such as that disclosed in German Pat. No. 2,322,884 published Nov. 22, 1973; U.S. Pat. Nos. 3,506,637 and 3,534,013; inter alia.

Still other less preferred chlorination processes comprise dissolving or suspending the resin in a chlorinated hydrocarbon solvent and promoting the reaction with heat, light, or a catalyst. Yet other processes utilize a fluidized bed of PVC which is contacted with chlorine gas, optionally diluted with an inert gas, and optionally also containing a lower chlorinated hydrocarbon, again catalyzed by ultraviolet radiation. Such processes have been disclosed in U.S. Pat. Nos. 3,532,612; 3,663,392; 3,813,370; Japanese Pat. No. 49-45310; British patent specification Nos. 1,089,323; 1,242,158; 1,318,078; and, German Pat. Nos. 1,110,873; 1,259,573; inter alia. These fluidized bed chlorination processes occur in a gaseous reaction medium, but with difficulty, because of the slow gaseous diffusion of chlorine into solid PVC macrogranules. The term "macrogranules" is used herein to define a cluster or aggregate of randomly closely packed primary particles of polymer. A handful of macrogranules has the feel of fine sand, and are also referred to as "grains". A macrogranule of PVC or CPVC will typically have an average diameter in excess of 20 microns, with a preponderance of particles in excess of 50 microns in diameter. A preferred size distribution of each macrogranule is in the range from about 50 to about 500 microns, and conventionally ranges from about 100 to about 200 microns. Each macrogranule is made up of a multiplicity of primary particles each in the size range from about 0.05 micron to about 5 microns, and more typically in the range from about 0.5 micron (5000 A) to about 2 microns (20,000 A). The bulk of the primary particles are usually submicronic in size, though conditions of polymerization will determine the actual size distribution of both primary particles, and also, macrogranules. Macrogranules can be characterized by their porosity, that is, internal pore volume, and surface area.

The morphology of PVC and CPVC macrogranules, specifically the porosity and surface area, are important properties which determine the physical properties of the polymer after it is molded. Since CPVC is generally derived by the chlorination of PVC, it has been found that the properties of product CPVC may be tailored to a large extent by precisely controlling the conditions under which precursor PVC is polymerized. Such a process is disclosed in U.S. Pat. Nos. 3,506,637 and 3,534,103. With care, the internal morphology of PVC macrogranules may be particularly tailored to permit relatively fast chlorination in a fluidized bed process catalyzed by actinic radiation. Even so, it is necessary for economy, to practice the process in two stages, as disclosed in U.S. Pat. No. 4,039,732 to Stamicarbon B.V.

I am unaware of any process for the relatively dry chlorination of PVC macrogranules in which only sufficient liquid chlorine ("$Cl_2$") is used as will "wet" the macrogranules without any visual appearance of having been "wetted". The terms "wet" and "wetted" are used herein to refer solely to the presence of liquid $Cl_2$ on macrogranules of polymer, and not to the presence of water. When the requisite amount of liquid $Cl_2$ within a narrowly specified range is absorbed by the solid PVC which is then irradiated with actinic (ultraviolet) radiation, there results a reaction in the solid PVC medium which chemically binds a predetermined amount of chlorine in the product CPVC. However, I am aware that it is known to chlorinate solid polyethylene ("PE") by reacting between 5 to 100 parts of liquid $Cl_2$ per part of PE, in a reaction medium of liquid $Cl_2$, until the resulting chlorinated PE (hereinafter "CPE" for brevity) dissolves in the liquid $Cl_2$, and then to recover CPE by evaporating the $Cl_2$. This process is described in greater detail in Canadian Pat. No. 471,037 to John L. Ludlow which teaches a process for the chlorination of ethylene polymers. In this process, PE is suspended in at least 5 parts liquid $Cl_2$ (hence referred to as "the high liquid $Cl_2$ process"), and irradiated with a suitable light source. The chlorination of PE proceeds from the surface inwardly, the chlorinated polymer dissolving from the polymer substantially immediately upon its formation, thereby exposing unchlorinated polymer. In this way the high liquid $Cl_2$ process makes it possible to chlorinate PE polymers at a rapid rate. However, many polymers of monoolefinically unsaturated monomers are not chlorinated in liquid $Cl_2$, or only slightly chlorinated. For example, poly(vinyl fluoride), and poly(vinylidene chloride-vinyl chloride, 88:12) are not chlorinated; and, as Ludlow taught, unless PE is suspended in at least 5 parts by weight liquid $Cl_2$, there is very little chlorination.

Because of the essential physical difference between liquid $Cl_2$ and gaseous $Cl_2$ (or "vapor $Cl_2$"), it would not be expected, in the chlorination of crystalline and non-crystalline polymers derived from alpha-beta-monoolefinically unsaturated monomers, to obtain essentially the same freedom of access to the interior portions of the polymers when chlorinating with liquid $Cl_2$, as when chlorinating with vapor $Cl_2$. Expectations relative to freedom of access are further complicated and clouded depending upon (a) the physical condition of the chlorinated exterior portion of the polymer and its ability in such condition either to impede or facilitate travel of liquid $Cl_2$ (or vapor $Cl_2$ in a "dry" process, that is, with non-wetted polymer), and (b) the probability of the chlorinated exterior dissolving into the liquid $Cl_2$ so as to continuously expose unchlorinated polymer. Yet, quite surprisingly, it is found that the rates of chlorination of a mass of PVC grains wetted with liquid chlorine only to the extent that it remains free-flowing with a visual indication of being dry (hence referred to as "wetted but free-flowing"), compared to dry PVC chlorinated with chlorine vapor, are close to being equal under essentially the same conditions of chlorination. This indicates that a vapor phase chlorination of dry free-flowing PVC, and chlorination of wet but free-flowing PVC are essentially analogous in reaction mechanism, and in the progress of each chlorination.

Particularly since Ludlow, supra, teaches the chlorination of ethylene polymers which are relatively crystalline, in a process in which chlorination proceeds in a liquid chlorine medium, it would be expected tht chlorination of polymers such as PVC which are relatively non-crystalline, would proceed more easily in a liquid chlorine medium than a crystalline polymer. It does. Quite unexpectedly however, chlorination of PVC also progresses satisfactorily in a solid reaction medium, this medium being solid polymer. The result is that relatively dry chlorination of a wetted but free-flowing mass of PVC macrogranules may be effected directly, that is, the relatively dry mass of PVC macrogranules is directly converted to a dry mass of CPVC macrogranules. This direct conversion of PVC to CPVC in a solid medium bypasses the problematical recovery of CPVC from a solution of CPVC in liquid $Cl_2$.

Though vapor-phase chlorination of PVC proceeds in the gaseous phase, the quality of CPVC produced is comparable to that produced by low liquid chlorination. This similarity of product quality is thought to stem from a realization of the expectation that the rate of chlorination of relatively non-crystalline polymers, initiated by actinic light, are not diffusion limited because $Cl_2$ molecules are free to gain access to all the interior portions of the polymer. But there was no reason to expect, prior to my discovery, that this freedom of $Cl_2$ molecules would extend to wetted but free-flowing PVC and account for such efficient chlorination. Accordingly, in the prior art, vapor-phase chlorination processes such as are described in U.S. Pat. Nos. 3,532,612; 3,663,392; 3,813,370 and 4,039,732 are preferred.

It was not expected that a wetted but free-flowing relatively non-crystalline massive polymer would be chlorinated so as to remain free-flowing, and resist being converted to a liquid or pasty mass, or to a mass of self-adherent grains because of dissolution in liquid $Cl_2$. Nor was it expected that desired chlorination could be effected without adversely affecting the physical characteristics so essential to the processability of CPVC in commercial manufacturing operations.

SUMMARY OF THE INVENTION

It has been discovered that solid, discrete, macrogranules of poly(vinyl chloride), hereinafter referred to as "PVC" for brevity, absorb more than their weight of liquid chlorine without forming a slurry. The term "absorb" is used throughout this specification to connote liquid chlorine held or trapped within a macrogranule, regardless of the precise mechanism by which the chlorine is held therewithin. A mass of PVC macrogranules, in which from about 0.1 part to about 3 parts by weight of liquid chlorine are absorbed in about 1 part by weight of PVC, is a wetted but free-flowing mass which visually appears to be dry. The liquid chlorine absorbed in the macrogranules is caused to react with them, in the presence of ultraviolet radiation, at a temperature in the range from about $-50°$ C. to about 25° C., to yield chlorinated poly(vinyl chloride), hereinafter referred to as "CPVC" for brevity. In the necessarily narrow range of ratios of liquid $Cl_2$ to solid PVC specified, the macrogranules of PVC provide not only a reactant for the reaction, but also provide a solid reaction medium in which the reaction proceeds with unexpected speed. A greater amount of liquid $Cl_2$ than 2:1 will tend to provide a significant liquid medium for the reaction. A lesser amount of liquid $Cl_2$, more than 0.1:1 but less than 0.6:1, produces "lightly chlorinated" PVC. Such lesser amount does not provide enough $Cl_2$ to keep the reaction going at a desirable rate if it is desired to obtain a chlorine content of 65% by wt, or more, in CPVC such as is used for the extrusion of pipe.

It has also been discovered that the direct chlorination of PVC by liquid chlorine in a solid reaction medium may be carried out in the presence of actinic radiation, without using additives such as swelling agents, accelerators and the like, so that the difficult problem of removing the additives from the CPVC product is avoided, not to mention the expense and inconvenience of using them in the first place.

It is therefore a general object of this invention to provide a process for the chlorination of solid macrogranules of PVC in which are absorbed a predetermined amount of liquid chlorine sufficient to convert it to CPVC, but insufficient to provide enough liquid chlorine to produce a wet slurry. The product CPVC so formed generally has substantially lower surface area than the PVC from which it was derived. Unexpectedly, the product CPVC is readily distinguishable over prior art CPVC compositions, both visually and by nuclear magnetic resonance analysis. Under low magnification in the range from about 30× to about 50× it is found that from about 5 to about 15% by wt of the macrogranules are discrete glassy translucent macrogranules easily distinguished from other milky white, opaque CPVC particles. The presence of these glassy macrogranules are characteristic of CPVC powders which have been directly converted from PVC by relatively dry chlorination with liquid $Cl_2$. Spectral data also distinguish the CPVC composition produced by the relatively dry chlorination process of this invention over prior art compositions. A comparison of thermal data for the novel CPVC composition with these data for prior art CPVC compositions, at the same chlorine levels, also clearly distinguishes the one from the others.

It has still further been discovered that the chlorination process of this invention is readily adaptable to a continuous process in which liquid chlorine is absorbed into macrogranules of PVC near one end of a reaction zone maintained at a temperature in the range from about $-50°$ C. to about 50° C., and the liquid chlorine-containing macrogranules are agitated as a free-flowing mass in the reaction zone while being exposed to actinic radiation. After a period of time sufficient to convert the PVC into CPVC containing a predetermined amount of chemically-bound chlorine in the CPVC, the desired product may be continuously recovered from near the other end of the reaction zone. By-product hydrogen chloride gas formed during the reaction is removed from the reaction zone; and concurrently evolved chlorine gas is optionally condensed and recycled as liquid chlorine to the reaction zone.

It is therefore a general object of this invention to provide a process for the continuous chlorination of a mass of PVC macrogranules in a solid reaction medium, supplied by the PVC itself, which chlorination is effected by having liquid chlorine absorbed in the PVC macrogranules. Some or all of the chlorine evolved during reaction, may be returned to the reaction zone as liquid which is reabsorbed into the PVC macrogranules so as to maintain a relatively dry, free-flowing mass of macrogranules.

Further, it has been discovered that a mixture of PVC macrogranules and PE particles, in a ratio in the range from about 95:5 to about 85:15 respectively, can be chlorinated under substantially the same temperature and pressure conditions for PVC (by itself) in this low liquid chlorine process, whether or not the process of this invention is practiced batch-wise, or as a continuous process, provided only if the mixture has absorbed therewithin at least 1.5 parts, but no more than 3 parts, by weight of liquid $Cl_2$.

It is therefore a general object of this invention to provide a process for co-chlorinating a mixture of PVC macrogranules and PE particles, in a ratio in the range from about 95:5 to about 85:15, which mixture has absorbed therewithin at least 1.5 parts by wt, but no more than 3 parts by wt of liquid $Cl_2$; and also, to provide a novel product especially adapted for use in an extruder, which product comprises coated macrogranules of CPVC visually distinguishable by the cluster of a multiplicity of CPE particles which adhere to each of substantially all the discrete CPVC macrogranules.

BRIEF DESCRIPTION OF THE DRAWINGS

The process of this invention will be more readily understood from the following detailed description taken in conjunction with photomicrographs of starting materials, chlorinated products derived therefrom, and schematic illustrations of the process in the accompanying drawings, wherein.

*Geon is a trademark of The B. F. Goodrich Company

Figure 3:
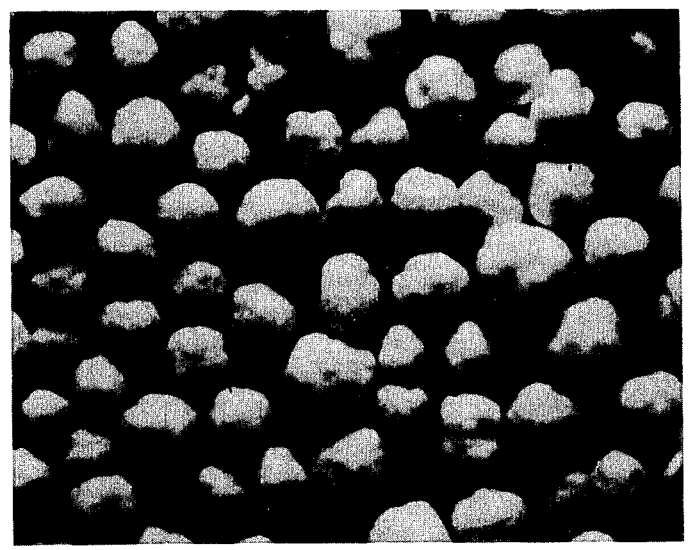
FIG. 3 is a photomicrograph, enlarged 45 times, of a typical mass of discrete macrogranules of Geon 92* PVC.
Figure 4:
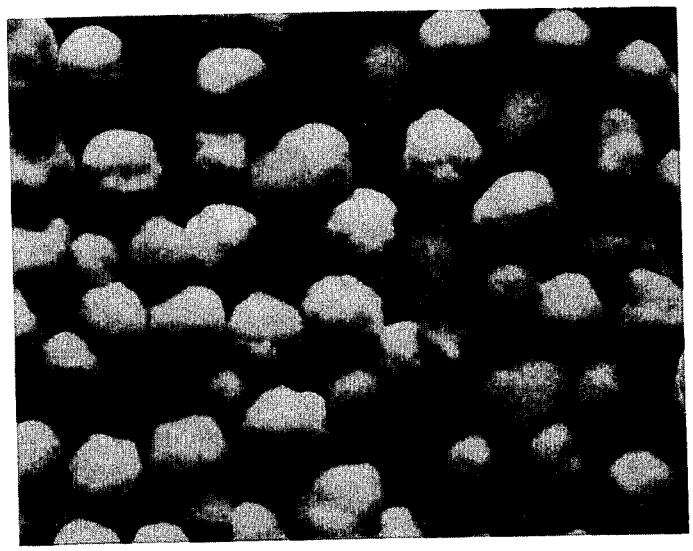

FIG. 4 is a photomicrograph, enlarged 45 times, of the Geon*92 PVC shown in FIG. 3 above, after it has been chlorinated in the low liquid process of this invention, showing the discrete glassy macrogranules of CPVC scattered among the milky opaque macrogranules of CPVC.

Figure 5:

FIG. 5 is a photomicrograph made with transmitted light and enlarged 20 times, of a blend of CPVC macrogranules (smaller images) and CPE particles (larger images). The CPVC is obtained by chlorinating Geon* 103EPF76 PVC in an aqueous suspension, and is commercially identified as Geon*603×560; the CPE is separately obtained by chlorinating PE in another process and is commercially identified as Dow X02243.45 chlorinated polyethylene. The blend has a characteristic photographic image.

Figure 6:

FIG. 6 is a photomicrograph made with transmitted light, and enlarged 20 times, of CPVC macrogranules (larger, darker images) obtained by co-chlorinating Geon* 103EPF76 PVC with a finely divided PE, commercially identified as USI Microthene* FA520 polyethylene. Clusters of CPE particles adhere to the CPVC macrogranules, and in addition, CPE particles are profusely distributed within the field of view.

DETAILED DESCRIPTION OF THE INVENTION

The chlorination process of this invention is not only unexpectedly efficient, but it also produces, directly, a CPVC composition which is distinguishable from prior art compositions. The efficiency of this process is attributable to a high concentration of chlorine molecules introduced as liquid directly into the interior of a PVC macrogranule, which itself provides a solid reaction medium in which the chlorination reaction can proceed in the presence of ultraviolet radiation, but without the presence of swelling agents or chlorohydrocarbon solvents. The process of this invention is peculiarly adapted to the chlorination of vinyl chloride homopolymer, because of the morphology of its macrogranules. However, it is also useful for the chlorination of solid mixtures of poly(vinyl chloride) homopolymer in conjunction with minor amounts of polymers of other monoolefinically unsaturated monomers. Preferred among such other monomers is polyethylene. The amount of polyethylene will vary depending upon the characteristics of the particular polymer, but from about 5 parts to about 20 parts by weight of polyethylene per 100 parts of poly(vinyl chloride) is preferred, the polyethylene having a density in the range from about 0.92 to about 0.96 and a melt index in the range from about 0.3 to about 21.0.

In the most preferred embodiment of this invention, it is used for chlorinating solid macrogranules of homopolymers of vinyl chloride, prepared by emulsion, suspension, solution or bulk polymerization techniques to yield a polymer having a relatively high molecular weight in the range from about 100,000 to about 1,000,000. In the process of this invention, the PVC starting material must have three essential chracteristics, namely, (1) a high molecular weight; (2) a macrogranular form; and (3) purity and freedom from contamination and degradation. These and other characteristics of the PVC starting material are disclosed in greater detail in U.S. Pat. No. 2,996,489 the disclosure of which is incorporated by reference herein as if fully set forth. The molecular weight of PVC may be related to its specific viscosity which is determined herein by dissolving 0.24 gram of the resin in 50 ml of nitrobenzene while mildly heating and agitating on a solution roller. The solutions are then filtered into an appropriate Ubbelohde viscometer, previously calibrated for the pure solvent. The flow times in seconds for the solutions are determined at four different dilutions to obtain flow data at a number of concentrations. A portion of the original filtered solution is dried to constant weight at 130° C. to obtain a true concentration value. The ratio of the flow time of the solution to the flow time of the pure solvent is a value known as the "reduced viscosity." When the number (1) is substracted from "reduced viscosity," one obtains the value known as the "specific viscosity." The PVC starting material in the process of this invention has a high molecular weight such that it possesses a specific viscosity of at least 0.20. Where some other polymer, for example polyethylene is to be co-chlorinated with PVC homopolymer, it is preferred that the polyethylene have a specific viscosity of at least 0.20.

The chlorination process of this invention is carried out at a temperature below the condensation point of chlorine, as it is critical that the chlorine be absorbed within the macrogranules of PVC be present in the liquid state, under the pressure conditions of the reaction. It is more preferred that the temperature of reaction be substantially below the condensation point of chlorine at the pressure at which the reaction is to be carried out. This preferred temperature of reaction is in the range from about $-50°$ C. to about 50° C., though a temperature as high as 70° C. is operable. At atmospheric pressure this temperature of reaction is preferably in the range from about $-50°$ C. to about $-40°$ C., though lower temperatures as low as about $-80°$ C. may be employed. At 100 psig, the reaction temperature is about 25° C., and even higher pressures and correspondingly high temperatures maybe used. However, above about 100 psig the benefits due to better diffusivity of liquid $Cl_2$ into the macrogranules of PVC and the particles of PE begin to be vitiated by the economic penalties of operating at the higher pressures.

Liquid chlorine is absorbed into macrogranules of PVC by spraying the liquid into a mass of granules which is being mildly agitated so as to present fresh macrogranule surfaces to the liquid which is quickly absorbed. By the term "absorbed" I refer to liquid chlorine held within a macrogranule, irrespective of whether the precise mechanism of holding the chlorine entails absorption, adsorption, chemisorption or physiosorption. The amount of liquid chlorine sprayed on to the mass of PVC to be chlorinated is in the range from about 0.6 part to about 3 parts by weight chlorine per part by weight of PVC. In this range, and in the more preferred range of from about 0.75 to about 1.5 parts by weight liquid chlorine per part by weight of PVC, the mass appears to be relatively dry, and free-flowing. Calculations indicate that 1.13 parts by weight liquid chlorine per part of PVC is sufficient to yield, theoretically, a CPVC with a chemically bound chlorine content of 73.1%. The precise amount of chlorine actually introduced will depend upon the time of the reaction, the intensity of the ultraviolet radiation, and the physical and chemical characteristics of the PVC starting material. It will be evident that the physical and chemical characteristics of the CPVC product will vary accordingly, the desired product being obtained by routine and simple trial and error to stabilize all the variables.

No swelling agents are used in the process of this invention, so that only trapped hydrogen chloride (HCl) and liquid chlorine not consumed in the reaction are to be removed. Because the chlorination reaction is exothermic, the temperature of the reaction mass will tend to rise. Some chlorine may be evolved along with byproduct HCl, and evaporation of the chlorine tends to allow the reaction to proceed substantially isothermally. In general, additional cooling will be required to maintain the desired temperature of the mass of PVC macrogranules. Both HCl and evaporated chlorine are conveniently removed as gas, and chlorine may be condensed and recycled to the reaction, if desired, as is explained in greater detail herebelow.

Any form of actinic radiation is suitable; for example, ordinary incandescent lamps, mercury vapor or arc lamps, neon glow tubes, fluorescent tubes, carbon arcs and sodium vapor lamps may be employed. Ultra-violet light is the preferred source of illumination. In order to obtain a highly heatstable chlorinated resin when the chlorination is stimulated by photoillumination, the intensity of illumination is desirably controlled to avoid surges in temperature.

The CPVC product formed by the low liquid chlorine process of this invention is distinguishable from prior art CPVC not only by its spectral "fingerprint," but also by its physical characteristics, particularly its appearance. A visual examination of the CPVC product under 45× magnification shows that the majority of macrogranules appear milky white. These CPVC macrogranules are visually generally similar in size, shape and color to the PVC macrogranules from which they were derived. A more detailed comparison of the photomacrographs in FIGS. 3 and 4 clearly shows the similarity of the milky white opaque macrogranules. However, referring to FIG. 4, there is also seen a scattering of macrogranules which are not opaque and milky white, but glassy and translucent. With incident light used to make FIGS. 3 and 4, visual observation of the glassy particles in FIG. 4 indicates that many appear to be transparent. The presence of a substantial amount of these particles, more than about 15% by wt, results in lowered Izod impact strength, and lower elongation at break, in an experimental extrusion grade CPVC composition, so an amount greater than 15% by wt is to be avoided.

The surface area of the CPVC macrogranules is characteristically lower than that of the PVC macrogranules from which they were derived, the decrease in surface area being in the range from about 10 to about 20 percent, depending upon the conditions of chlorination of the PVC. Surface area is measured by the BET method using nitrogen adsorption, as more fully described by Brunauer, Emmett and Teller in J.A.C.S. 60, 309-319, (1938).

When compared at the same weight percent chlorine, all CPVCs have essentially the same set of $^{13}C$ nmr chemical shifts. An easily observed feature of these spectra is the appearance of particular chemical shifts originating from sequences of unchlorinated PVC. Typically, a CPVC produced by the aqueous chlorination method, containing 65% by wt $Cl_2$ contains about 10–20% sequences of unchlorinated PVC. In contrast, CPVC prepared by the low liquid chlorination process of this invention, and also containing 65% by wt chlorine, contains about one-half the number of sequences of unchlorinated PVC, that is, in the range from about 3–5%. In addition, it can be shown that the CPVC prepared by the aqueous process contains a much different distribution of tacticities compared with that of CPVC prepared by the low liquid chlorine process.

Since the major portion of CPVC is produced for use in the piping industry, pipe grade CPVC contains at least 65% by wt $Cl_2$. However, there are some uses for CPVC where such high chlorine content (at least 65%) is not essential. For such uses, CPVC with a chlorine content in the range from about 59% to about 65% $Cl_2$ by wt, referred to as "lightly chlorinated PVC" is produced, which in combination with appropriate additives gives much improved properties. For example, flammability compares favorably with that of pipe grade CPVC. Lightly chlorinated PVC can be used not only to obtain better fire resistance than can be obtained with PVC, but also better thermal stability. Where such lightly chlorinated PVC is to be produced by the low liquid chlorine process of this invention, a much lower amount of liquid chlorine may be used than that required for pipe grade CPVC, particularly if the rate of reaction is not important. Thus, excellent lightly chlorinated PVC may be produced with as little as 0.1 part by wt of liquid $Cl_2$ per unit part by wt of PVC macrogranules, under generally the same temperature, pressure and photoillumination conditions as used to chlorinate with from about 0.6 to about 3 parts by wt of liquid $Cl_2$.

Figure 1:
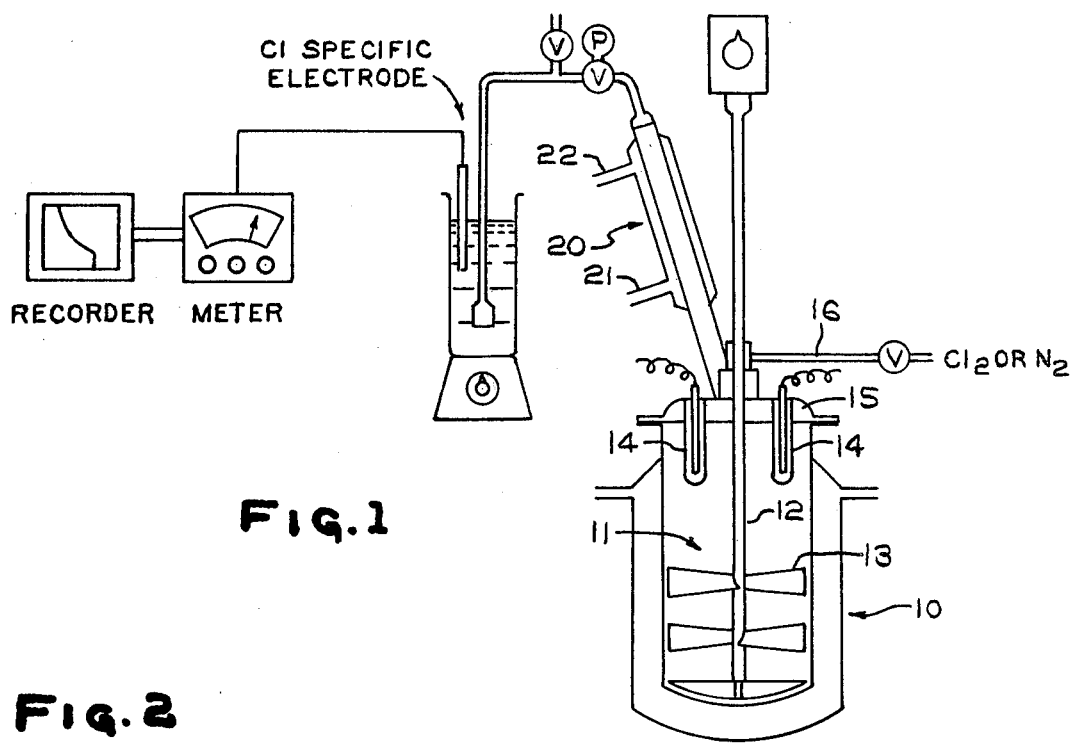
FIG. 1 is a flowsheet schematically illustrating the principal features of a batch process for the chlorination of a relatively dry mass of PVC macrogranules in which is absorbed liquid chlorine.

Referring now to FIG. 1, there is shown a flowsheet schematically illustrating a batch process of this invention. A jacketed reactor 10, suitably designed for operation at elevated temperature up to about 50° C. and pressure up to about 100 psig, is equipped with a paddle stirrer, indicated generally by reference numeral 11, having a central shaft 12 and blades 13 designed to churn a mass of macrogranules of PVC (not shown) in the reactor, so that all macrogranules in the mass are uniformly irradiated by a bank of ultraviolet lamps 14 sealingly fitted into the cover 15 of the reactor. The cover is bolted to the reactor and tightly sealed for operation at the desired pressure, which preferably, is in the range from about 50 psig to about 100 psig. The cover is provided with a flanged nozzle (not shown) through which a jacketed condenser, indicated generally by reference numeral 20, is placed in open fluid communication with the interior of the reactor 10. The condenser 20 is fitted with inlet nozzle 21 and outlet nozzle 22 through which nozzles a cold heat transfer liquid (cryogen) is circulated at a temperature low enough to condense chlorine vapors evolved during the reaction, but not so low as to condense byproduct HCl gas which is also evolved. Liquid $Cl_2$ is charged to the reactor through feed line 16. $Cl_2$ vapor evolved during reaction is condensed and returned to the reactor being dripped upon the mass of macrogranules while they are being agitated. The cover 15 is also provided with a vent through which excess chlorine may be removed from the reactor. Optionally the cover may also be fitted with a nozzle through which an inert gas, such as nitrogen which does not enter into the chlorination reaction, may be fed to the reactor, either to assist in maintaining control of the temperature of the reaction, or to provide fluidization of the macrogranules to supplement the agitation provided by the stirrer 11.

Typically, the chlorination reaction is carried out batch-wise by charging a mass of macrogranules of PVC to the reactor, and commencing agitation to lower the temperature to about −0° C. which is slightly higher than the temperature of the cooling fluid circulated through the reactor's jacket. A predetermined weight of liquid chlorine at about −0° C. is then slowly sprayed onto the churning mass of PVC macrogranules until all the liquid chlorine is absorbed by the mass of PVC macrogranules. The ultraviolet lamps 14 are then switched on and agitation continued. No catalyst other than the u-v light is either desirable or necessary. The progress of the reaction may be monitored by noting the amount and rate at which HCl is evolved from the reaction zone of the reactor. When the reaction is essentially complete, as indicated by no further evolution of HCl, the agitation is stopped, and the CPVC formed is recovered. Runs at room temperature and corresponding pressure of about 100 psig are made in an analogous manner.

Figure 2:
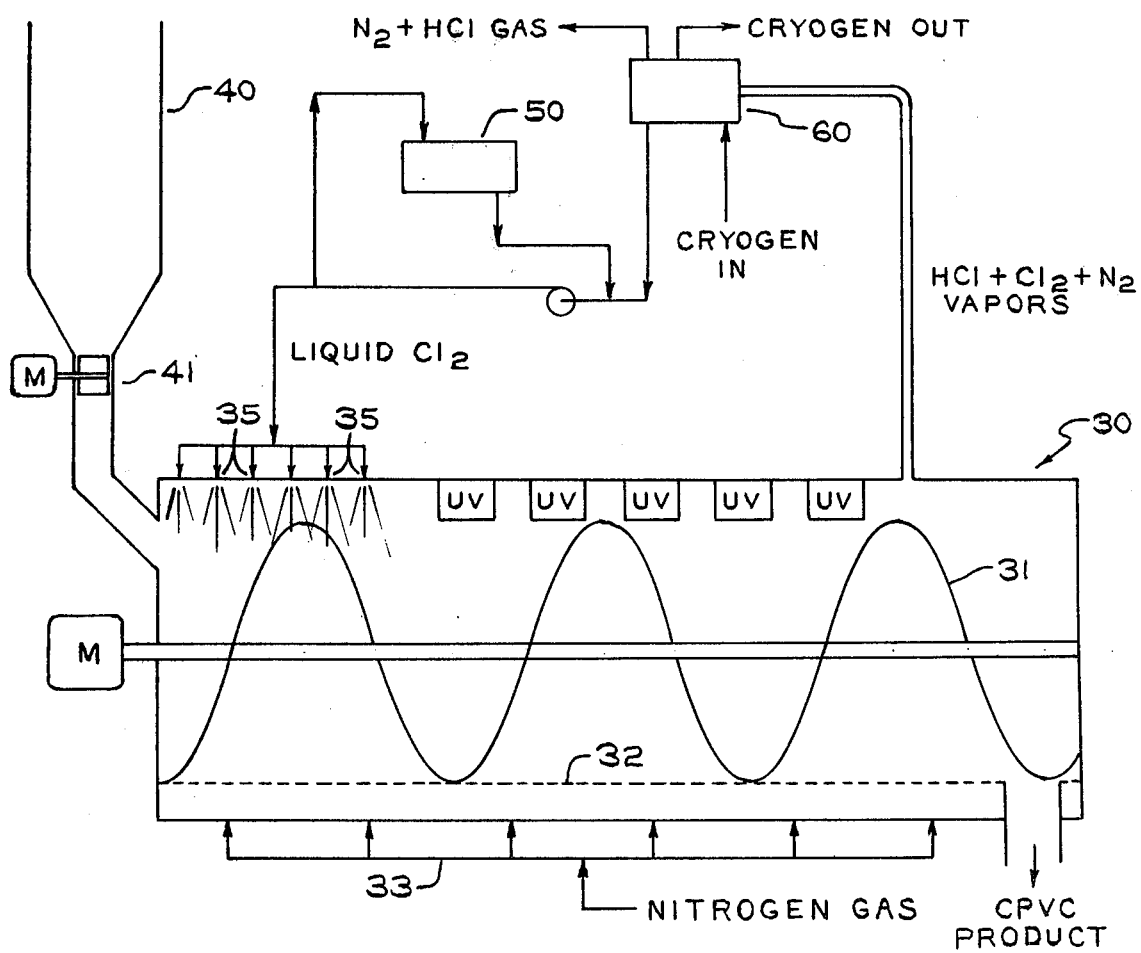
FIG. 2 is a flowsheet which schematically illustrates the principal features of a continuous process for the chlorination of a relatively dry mass of PVC macrogranules in which is absorbed liquid chlorine.

Referring now to FIG. 2, there is shown a flowsheet schematically illustrating a continuous process of this invention. A horizontal, elongated jacketed reactor 30 is equipped with a longitudinally axial helical agitator (referred to as a "votator") 31 with flights designed to lift macrogranules of PVC feed from near the bottom surface of the reactor to the top. The PVC feed is continuously flowed into the reactor from a PVC storage bin 40, by being metered through a vaned powder metering device 41 driven by an electric motor. The PVC feed enters near one end of the horizontal reactor 30. The lower portion of the reactor 30 is fitted with a chordal porous plate 32 which sections off the lower portion of the reactor immediately below the votator 31. The plate 32 serves to diffuse nitrogen gas uniformly along the length of the reactor. The nitrogen gas is introduced below the porous plate at several locations sith a manifold 33, thus serving to fluidize the macrogranules of PVC and also to maintain the temperature of the reaction zone within the reactor at about 0° C., which is the temperature at which the nitrogen is introduced. The votator 31 is driven by an electric motor at a speed sufficient to churn the macrogranules exposing the surfaces of each to a liquid chlorine spray pumped into the reactor, near one end, through spray nozzles 35. The liquid chlorine is maintained at about 0° C. in a storage tank 50 from which it is pumped to the nozzles. The liquid chlorine spray is soon absorbed by the churned macrogranules of PVC, which are moved longitudinally towards the other end of the reactor. In the mid-section of the reactor, which constitutes its reaction zone, there is provided above the votator 31, a bank of ultraviolet lights identified as "UV," which illuminate the liquid chlorine containing PVC macrogranules, and stimulate chiorination of the PVC to convert it to CPVC. As the chlorination reaction progresses, HCl gas is evolved, and because the reaction is exothermic, sufficient heat is generated to evaporate some of the liquid chlorine absorbed in the PVC macrogranules. Though such evaporation of chlorine helps stabilize the temperature in the reaction zone, it is undesirable to permit so much chlorine to evaporate as will adversely affect the chlorination of the PVC. The amount of chlorine evaporated is controlled by maintaining a sufficiently low temperature in the reaction zone. This temperature is desirably controlled by controlling the temperature of the nitrogen gas being introduced to assist in the fluidization of the macrogranules.

Byproduct HCl gas, $N_2$ gas and chlorine vapors are removed from the reaction zone and flowed to a condenser 60 through which a cryogen is circulated to condense the chlorine, allowing only the HCl and $N_2$ to be recovered as gases. The condensed chlorine is desirably recycled to the spray nozzles. Nitrogen is separated from the HCl and recycled into the reactor, and the HCl is used in another process.

A mixture of macrogranules of PVC and particles of PE in a ratio in the range from about 95:5 to about 85:15 may also be chlorinated under substantially the same temperature and pressure conditions as those used for the low liquid chlorination of PVC alone. However, amounts of liquid chlorine less than 1.5 parts by wt per unit weight of PVC and PE mixture are wholly ineffective to produce an appreciable amount of CPVC. It appears that at levels below the 1.5:1.0 level, the liquid chlorine is predominantly absorbed by the PE particles with the result that so much PVC is left chlorinated, that, at first appraisal, any further attempts to co-chlorinate the polymers, would appear futile. Upon further addition of liquid chlorine, in an amount greater than 3 parts by wt per unit wt of PVC and PE mixture, it is found that a substantial amount of the PE particles are dissolved in the liquid $Cl_2$ resulting in a slurry-like mixture which is physically distinguishable by its flow characteristics from the unchlorinated mixture of solid polymers. Moreover, the product obtained upon co-chlorination of a mixture with greater than about 3 parts by wt of liquid $Cl_2$ per unit wt of solid polymer, does not have desirable physical properties for extrusion or injection molding of the co-chlorinated mixture.

Within the narrow range of from about 1.5 parts to about 3.0 parts by wt of liquid $Cl_2$ per unit wt of mixed unchlorinated resin, the mixture is wetted but free-flowing and has the appearance of being dry. The product formed by chlorinating such a wetted but free-flowing mixture is readily distinguishable from other mixtures such as are conventionally made by mixing CPVC and CPE, irrespective of the origin of either component. Applicant is unaware of any prior art chlorination of a mixture of PVC and PE, and particularly of any mixture of solid PVC and solid PE which produces discrete particles of CPVC to which are bound a cluster of CPE particles the majority of which CPE particles are discrete.

Measurement of the glass transition temperature ($T_g$) at a particular chlorine level (%$Cl_2$) of the co-chlorinated mixture, an analysis of its $^{13}C$ nmr spectra, and evaluation of the results measured with a differential scanning calorimeter (DSC) indicate that the co-chlorinated product of this invention is distinguishable over prior art compositions. For example, the co-chlorinated mixture shows (a) a generally lower crystallinity than prior art resins as evidenced by lower heats of melting measured by DSC, and (b) sufficient crystallinity of the PE in the mixture to be evident in a thermal analysis curve. From a purely physical point of view, a visual examination of Geon* 603×560 and DuPont LD-963 CPE mixed in a ratio of 90:10, is clearly a simple mixture demonstrating nothing more than occasional physical clumping of CPE particles occasionally upon a discrete CPVC macrogranule. In comparison, viewing the microphotograph of FIG. 6, it is apparent that clusters of CPE particles are bonded to macrogranules of CPVC. Though some clusters of CPE appear as agglomerates of many closely packed CPE particles, most CPVC macrogranules show clusters of discrete CPE particles on each macrogranule.
*Geon is a Trademark of The B. F. Goodrich Company

EXAMPLES

In a typical pilot plant run, 400 parts by wt of macrogranules of Geon*103EPF76 poly(vinyl chloride) resin, a general purpose resin, are charged to the jacketed reactor fitted with a helical paddle stirrer, and a bank of ultraviolet lights some or all of which may be turned on, as desired. Liquid cryogen such as a chilled brine solution, is circulated through the jacket of the reactor so as to keep the liquid chlorine in the liquid state at the pressure and temperature at which the chlorination reaction is to be carried out. After charging the reactor with PVC the reactor and its contents are subjected to vacuum, or flushed with an inert gas, preferably nitrogen. Thereafter, liquid chlorine is sprayed into the reactor while the macrogranules of PVC are being slowly churned by the paddle stirrer, until 500 parts of liquid $Cl_2$ are charged.

The reaction mass, though soaked with liquid $Cl_2$ appears to require substantially the same amount of mixing energy to churn it as was required prior to soaking. It is churned for a period of about 30 mins. This period is a "soak period" deemed critical to a successful utilization of this low liquid chlorine process. The duration of the soak period will vary depending upon the temperature and pressure at which the reaction is carried out, and may range from about 10 minutes to about 2 hours. This soak period is thought to allow time for the liquid $Cl_2$ to permeate the macrogranules so as to place themselves in effective positions within the PVC macrogranules to chlorinate them as desired. After the soak period, the bank of lights is turned on to irradiate the reaction mass substantially uniformly. The period of irradiation is in the range from about 4 to about 9 hours depending upon the particular physical characteristics of the PVC, and the intensity of the lights. A more preferred time for irradiation is in the range from about 5 to about 6 hours. While the mass is being irradiated, it is continuously slowly stirred to facilitate evolution of HCl and $Cl_2$ from the reaction mass, and to permit more uniform chlorination of the PVC. For economic reasons the preferred temperature of operation is in the range from about 0° C. to about 35° C., and the chlorine evolved is condensed and returned to the reactor for another run; the HCl evolved is recovered for use in another reaction. At the end of the reaction, the reactor is preferably again flushed with an inert gas, or subjected to vacuum stripping, to get rid of free chlorine and HCl still remaining. The chlorinated polymer (CPVC) is then recovered, and remaining traces of free chlorine and HCl are removed by drying the polymer.

The intensity of photo-illumination is not critical, and is chosen so as to obtain the desired conversion of PVC in a desirable period of time. It will also be recognized that the physical configuration of the reactor may impose certain limitations on the amount and intensity of actinic radiation which may be provided.

In an analogous manner, a mixture of 400 parts by wt of macrogranules of Geon*103EPF76 poly(vinyl chloride) and 28 parts by wt of Microthene FA520 polyethylene (and others) are co-chlorinated in the pilot plant reactor.
*Geon is a Trademark of The B. F. Goodrich Company Several other runs are made in a laboratory reactor, Table I setting forth the conditions under which PVC is chlorinated, and Table II setting forth the conditions under which a mixture of PVC and PE is co-chlorinated, and in each case stating the results obtained. The surface area of the PVC starting material in Table I, measured by the BET method, is in the range from about 1.25 to about 1.75 m$^2$/g, and the surface area of the CPVC obtained is less than 1.0 m$^2$/g, the decrease in surface area being characteristically in the range from about 20 to about 50%. The surface areas of the mixtures of PVC and PE starting material used in the examples set forth in Table II are likewise greater than the surface area of the co-chlorinated mixture obtained, though the decrease generally obtained was not measured.

TABLE I

Chlorination of PVC

| PVC resin identified | Surface area of PVC m²/g | PVC resin charged g. | Liquid Cl₂ charged g. | Ratio Cl/PVC | ultraviolet light used | chl'n't'n time mins. | % Cl₂ in CPVC | $T_g$ °C. | TGA+ 10% wt. loss, at °C. |
|---|---|---|---|---|---|---|---|---|---|
| 103EPF76** | 1.69 | 100 | 113 | 1.13 | PenRay | 300 | 66.9 | 145 | 307 |
| 103EPF76 | 1.69 | 100 | 75 | 0.75 | 300 w | 360 | 66. | 131 | 310 |
| 103EPF76 | 1.69 | 100 | 60 | 0.60 | 300 w | 360 | 65.5 | 130 | 308 |
| Geon* 92 | 1.14 | 100 | 113 | 1.13 | 300 w | 300 | 65.9 | 141 | 304 |
| 103EPF76 | 1.69 | 100 | 175 | 1.75 | PenRay | 300 | 65.6 | 145 | 310 |
| 103EPF76 | 1.69 | 100 | 125 | 1.25 | PenRay(2) | 240 | 66.5 | 145 | 305 |
| 110 × 346** | 0.40 | 400 | 300 | 0.75 | 300 w | 180 | 62.3 | 113 | — |
| 103EPF76 | 1.69 | 100 | 226 | 2.26 | PenRay | 240 | 67.9 | 155 | — |
| 103EPF76 | 1.69 | 100 | 175 | 1.75 | PenRay | 300 | 59.2 | 99 | — |
| 110 × 346 | 0.40 | 400 | 300 | 0.75 | 300 w | 135 | 61.1 | 105 | — |

+under nitrogen
**code for Geon* brand PVC resins manufactured and sold by The B. F. Goodrich Company
*Geon is a Trademark of The B. F. Goodrich Company

TABLE II

Co-chlorination of PVC and PE

| PVC resin identified | PE identified | PVC resin charged g. | PE charged g. | Liquid Cl₂ charged g. | Ratio Cl/mix | ultraviolet light used | chl'n't'n time mins. | % Cl₂ in mix | $T_g$ °C. | TGA+ 10% wt. loss, at °C. |
|---|---|---|---|---|---|---|---|---|---|---|
| 103EPF76** | none | 400 | 0 | 400 | 1.00 | 300 w | 300 | 66.35 | 136 | 308 |
| 103EPF76 | M'th'ne# 520 | 340 | 60 | 400 | 1.00 | 300 w | 300 | 59.2 | 115 | |
| 103EPF76 | Gulf 8412 | 95 | 5 | 100 | 1.00 | 300 w | 180 | 64.75 | 142 | 318 |
| 103EPF76 | Gulf 8412 | 90 | 10 | 100 | 1.00 | 300 w | 180 | 62.6 | 140 | 307 |
| 103EPF76 | Gulf 8412 | 85 | 15 | 100 | 1.00 | 300 w | 180 | 62.6 | 136 | 313 |
| 103EPF76 | M'th'ne 510 | 100 | 6 | 175 | 1.7 | PenRay | 360 | 65.5 | 151 | 305 |

+under nitrogen
**code for Geon* brand PVC resins manufactured and sold by The B. F. Goodrich Company
*Geon is a Trademark of The B. F. Goodrich Company
Microthene is a Trademark of U.S. Industries, Inc.

I claim:

1. A process for chlorinating a mass of freely flowable solid, discrete, poly(vinyl chloride) macrogranules, comprising, contacting said mass with from about 0.1 part to about 3 parts by weight of liquid chlorine per part by weight of said mass, at a temperature in the range from about −50° C. to about 50° C.; absorbing said liquid chlorine in said poly(vinyl chloride) macrogranules to produce liquid chlorine-containing macrogranules; agitating said liquid chlorine-containing macrogranules to maintain a reaction zone in which said mass is a free-flowing mass; irradiating said free-flowing mass of liquid chlorine-containing macrogranules with actinic radiation for a period of time sufficient for a reaction of said liquid chlorine in a solid medium, which reaction chemically bonds at least 59% by weight of chlorine with said poly(vinyl chloride) which is thus converted to chlorinated poly(vinyl chloride); removing hydrogen chloride from said reaction zone; and, recovering a free-flowing mass of macrogranules of said chlorinated poly(vinyl chloride).

2. The process of claim 1 wherein said macrogranular particles of said poly(vinyl chloride) polymer have an average diameter in the range from about 10 microns to about 500 microns, and a porosity in the range from about 0.2 to about 0.3.

3. The process of claim 2 wherein said macrogranular particles of said poly(vinyl chloride) individually consist essentially of a mass of primary particles of said polymer having an average diameter in the range from about 0.05 microns to about 5.0 microns.

4. The process of claim 3 wherein said microgranules of chlorinated poly(vinyl chloride) have substantially the same size and shape, but lower surface area than said macrogranules of poly(vinyl chloride) from which the former were derived.

5. The process of claim 4 wherein agitating said mass includes introducing an inert gas into said reaction zone.

6. The process of claim 4 wherein agitating said mass includes mechanically agitating it in said reaction zone.

7. The process of claim 4 including removing gaseous chlorine from said reaction zone, condensing said gaseous chlorine, and returning liquid chlorine to said reaction zone.

8. The process of claim 1 wherein said process is continuous.

9. A process for chlorinating a mass of freely flowable solid, discrete, poly(vinyl chloride) macrogranules intermingled with solid, discrete particles of polyethylene comprising, contacting said mass with from about 1 part to about 3 parts by weight of liquid chlorine per part by weight of said mass, at a temperature in the range from about −50° C. to about 50° C.; absorbing said liquid chlorine in said poly(vinyl chloride) macrogranules to produce liquid chlorine-containing PVC macrogranules, and adsorbing said liquid chlorine on said polyethylene to produce liquid chlorine-coated PE particles; agitating said liquid chlorine-containing PVC macrogranules and said liquid chlorine-coated PE particles to maintain a reaction zone in which said mass is a free-flowing mass; irradiating said free-flowing mass with actinic radiation for a period of time sufficient to react a predetermined amount of chlorine (a) with said poly(vinyl chloride) which is thus converted to chlorinated poly(vinyl chloride) by reaction of said liquid chlorine in a solid medium, and (b) with said polyethylene which is thus converted to chlorinated polyethylene; removing hydrogen chloride from said reaction zone; and, recovering a free-flowing mass of macrogranules of said chlorinated poly(vinyl chloride) to which a cluster of discrete particles of said chlorinated polyethylene are bonded.

10. The process of claim 9 wherein said macrogranular particles of said poly(vinyl chloride) polymer have an average diameter in the range from about 10 microns to about 500 microns, and a porosity in the range from about 0.2 to about 0.3.

11. The process of claim 10 wherein said macrogranular particles of said poly(vinyl chloride) individually consist essentially of a mass of primary particles of said polymer having an average diameter in the range from about 1 micron to about 10 microns; and said chlorinated polyethylene particles have an average diameter in the range from about 10 microns to about 100 microns.

12. The process of claim 11 wherein said macrogranules of chlorinated poly(vinyl chloride) have substantially the same size and shape, but lower surface area than said macrogranules of poly(vinyl chloride) from which the former were derived; and said chlorinated polyethylene particles have essentially the same size as the particles of polyethylene from which they were derived.

13. The process of claim 12 wherein said free-flowing mass consists essentially of from about 5 to about 20 parts by weight of polyethylene per 100 parts of poly(vinyl chloride), and said polyethylene has a density in the range from about 0.92 to about 0.96, and a melt index in the range from about 0.3 to about 21.0.

14. The process of claim 12 wherein agitating said mass includes introducing an inert gas into said reaction zone.

15. The process of claim 13 wherein agitating said mass includes mechanically agitating it in said reaction zone.

16. The process of claim 13 including removing gaseous chlorine from said reaction zone, condensing said gaseous chlorine, and returning liquid chlorine to said reaction zone.

17. The process of claim 9 wherein said process is continuous.

18. A chlorinated poly(vinyl chloride) composition comprising a product obtained by chlorinating a mass of freely flowable solid, discrete, poly(vinyl chloride) macrogranules, comprising, contacting said mass with from about 0.1 part to about 3 parts by weight of liquid chlorine per part by weight of said mass, at a temperature in the range from about $-50°$ C. to about $50°$ C.; absorbing said liquid chlorine in said poly(vinyl chloride) macrogranules to produce liquid chlorine-containing macrogranules; agitating said liquid chlorine-containing macrogranules to maintain a reaction zone in which said mass is a free-flowing mass; irradiating said free-flowing mass of liquid chlorine-containing macrogranules with actinic radiation for a period of time sufficient for a reaction of said liquid chlorine in a solid medium, which reaction chemically bonds at least 59% by weight of chlorine with said poly(vinyl chloride) which is thus converted to chlorinated poly(vinyl chloride); removing hydrogen chloride from said reaction zone; and, recovering a free-flowing mass of macrogranules of said chlorinated poly(vinyl chloride) in the form of macrogranules having a size range from about 50 to about 500 microns, and from about 5 to about 15% by weight of said macrogranules, when magnified, have the appearance of being translucent, the remaining being milky and opaque.

19. A chlorinated poly(vinyl chloride) and chlorinated polyethylene composition comprising a product obtained by chlorinating a mass of freely flowable solid, discrete, poly(vinyl chloride) macrogranules intermingled with solid, discrete particles of polyethylene comprising, contacting said mass with from about 1 part to about 3 parts by weight of liquid chlorine per part by weight of said mass, at a temperature in the range from about $-50°$ C. to about $50°$ C.; absorbing said liquid chlorine in said poly(vinyl chloride) macrogranules to produce liquid chlorine-containing PVC macrogranules, and adsorbing said liquid chlorine on said polyethylene to produce liquid chlorine-coated PE particles; agitating said liquid chlorine-containing PVC macrogranules and said liquid chlorine-coated PE particles to maintain a reaction zone in which said mass is a free-flowing mass; irradiating said free-flowing mass with actinic radiation for a period of time sufficient to react a predetermined amount of chlorine with (a) with said poly(vinyl chloride) which is thus converted to chlorinated poly(vinyl chloride) by reaction of said liquid chlorine in a solid medium, and (b) with said polyethylene which is thus converted to chlorinated polyethylene; removing hydrogen chloride from said reaction zone; and, recovering a free-flowing mass of macrogranules of said chlorinated poly(vinyl chloride), and particles of chlorinated polyethylene, said macrogranules being in the form of macrogranules having a size range from about 50 to about 500 microns, and from about 5 to about 15% by weight of said macrogranules, when magnified, have the appearance of being translucent, the remaining being milky and opaque, and the majority of said macrogranules having a cluster of discrete particles of said chlorinated polyethylene bonded thereto.

20. The product of claim 19 wherein from about 30% to about 60% by weight of the chlorinated polyethylene occurring in runs of 9 or more carbon atoms is unchlorinated, and the chlorinated runs contain from about 50% to about 60% by weight chlorine.

* * * * *